United States Patent
Cho et al.

(10) Patent No.: US 9,182,842 B2
(45) Date of Patent: Nov. 10, 2015

(54) MOBILE TERMINAL

(71) Applicant: LG Electronics Inc., Seoul (KR)

(72) Inventors: Donghyuk Cho, Seoul (KR); Jonghwan Lee, Seoul (KR); Sanga Lee, Seoul (KR); Sunggyu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 145 days.

(21) Appl. No.: 13/863,174

(22) Filed: Apr. 15, 2013

(65) Prior Publication Data

US 2013/0285953 A1   Oct. 31, 2013

(30) Foreign Application Priority Data

Apr. 26, 2012 (KR) .................. 10-2012-0044025

(51) Int. Cl.
  *G06F 3/041* (2006.01)
(52) U.S. Cl.
  CPC ....................... *G06F 3/041* (2013.01)
(58) Field of Classification Search
  CPC .......... G06F 3/041; G06F 3/048; G06T 13/00
  USPC .................... 345/173–175; 341/23
  See application file for complete search history.

(56) References Cited

U.S. PATENT DOCUMENTS

| | | | |
|---|---|---|---|
| 2008/0143683 A1* | 6/2008 | Hotelling | 345/173 |
| 2009/0128372 A1* | 5/2009 | Wu et al. | 341/23 |
| 2010/0043246 A1* | 2/2010 | Smith et al. | 34/147 |
| 2011/0181603 A1* | 7/2011 | Liang et al. | 345/473 |
| 2011/0242058 A1* | 10/2011 | Lee et al. | 345/176 |
| 2012/0268402 A1* | 10/2012 | Wang et al. | 345/173 |
| 2014/0043246 A1* | 2/2014 | Hsueh et al. | 345/173 |

FOREIGN PATENT DOCUMENTS

| | | |
|---|---|---|
| CN | 101896842 A | 11/2010 |
| TW | 201135555 A | 10/2011 |

* cited by examiner

*Primary Examiner* — Grant Sitta
(74) *Attorney, Agent, or Firm* — Birch, Stewart, Kolasch & Birch, LLP

(57) ABSTRACT

A mobile terminal is provided. The mobile terminal includes a window including a key button portion, a light-transmissive pattern formed at a rear surface of the window, a touch sensor disposed to cover the rear surface of the window and a metal pattern formed at one surface of the touch sensor, the metal pattern overlapping the key button portion so as to be exposed through the light-transmissive pattern.

17 Claims, 6 Drawing Sheets

A                    B

MOBILE TERMINAL

CROSS-REFERENCE TO RELATED APPLICATION

Pursuant to 35 U.S.C. §119(a), this application claims the benefit of earlier filing date and right of priority to Korean Application No. 10-2012-0044025 filed on Apr. 26, 2012, the contents of which is incorporated by reference herein in its entirety.

BACKGROUND OF THE INVENTION

1. Field of the Invention

The present disclosure relates to a mobile terminal in which a key button portion is formed in a window.

2. Description of Related Art

In addition, as mobile terminals are considered as personal belongings to express personality, various designs are required. Designs of mobile terminal include structural alteration improving the exterior of mobile terminals and improvements.

As one of the structural alternations and improvements, recently, research has been conducted to improve an image of a picture portion (hereinafter, referred to as a 'picto part') of a front key button portion in order to implement a terminal providing a high-end feeling. Thus, a mobile terminal capable of implementing a picto part providing a sophisticated feeling, while saving production cost, may be considered.

BRIEF SUMMARY OF THE INVENTION

Therefore, an aspect of the detailed description is to provide a mobile terminal having a front picto part formed to provide a metal feeling to upgrade an image thereof, and having a novel structure for implementing the same.

To achieve these and other advantages and in accordance with the purpose of this specification, as embodied and broadly described herein, a mobile terminal includes: a window including a key button portion having a light-transmissive pattern formed on a rear surface thereof; and a touch sensor disposed to cover the rear surface of the window and having a metal pattern formed one surface thereof, wherein the metal pattern overlaps with the key button portion so as to be exposed outwardly through the light-transmissive pattern.

According to an example in relation to an embodiment of the present invention, the mobile terminal may further include: a detection unit configured to detect a touch input applied to an input region by using a change in a quantity of electric charges detected by the touch sensor.

According to another example in relation to an embodiment of the present invention, the metal pattern may be formed on the same plane on which a conductive pattern electrically connecting the touch sensor and the detection unit is formed.

According to another example in relation to an embodiment of the present invention, the touch sensor may include: a first electrode film configured to sense a touch input applied in a first direction; and a second electrode film formed to cover a rear surface of the first electrode film and configured to sense a touch input applied in a second direction, wherein the conductive pattern and the metal pattern may be formed on the rear surface of the first electrode film.

According to another example in relation to an embodiment of the present invention, the mobile terminal may further include: a light source disposed in a direction of the rear surface of the touch sensor; and a light guide film disposed between the light source and the touch sensor to guide light irradiated from the light source toward the light-transmissive pattern.

According to another example in relation to an embodiment of the present invention, the metal pattern may include a light-transmissive portion allowing light from the light source to pass therethrough.

According to another example in relation to an embodiment of the present invention, the light-transmissive portion may include holes of particular shape which disposed side by side to from a pattern.

According to another example in relation to an embodiment of the present invention, the particular shape may be a regular hexagonal shape.

According to another example in relation to an embodiment of the present invention, an aperture ratio of the light-transmissive portion may range from 25% to 40%.

According to another example in relation to an embodiment of the present invention, a plurality of protrusion patterns may be formed to be protruded from the surface of the light guide film such that they are perpendicular to the surface of the light guide film.

According to another example in relation to an embodiment of the present invention, a diffusion sheet may be disposed between the window and the light guide film in order to scattered-reflect light irradiated from the light source.

According to another example in relation to an embodiment of the present invention, the diffusion sheet may consists of a synthetic resin and bead particles attached to the synthetic resin to scatter light.

According to another example in relation to an embodiment of the present invention, the synthetic resin sheet may be made of any one among polyethylene, polycarbonate, and polymethylmethacrylate (PMMA).

According to another example in relation to an embodiment of the present invention, the diffusion sheet may include a first layer and a second layer disposed to be laminated and having different refractive indices.

According to another example in relation to an embodiment of the present invention, a protrusion may be formed on a surface of the first layer to refract light.

According to another example in relation to an embodiment of the present invention, a recess is formed on a surface of the second layer to refract light.

According to another example in relation to an embodiment of the present invention, the protrusion and the recess may be formed to be engaged with each other.

According to another example in relation to an embodiment of the present invention, the metal pattern may be surface-machined to allow for feeling various images at an outer side.

According to another example in relation to an embodiment of the present invention, the surface machining may be performed by depositing a different metal on a surface of the metal pattern.

According to another example in relation to an embodiment of the present invention, the surface-machining may be performed by etching a surface of the metal pattern to provide a three-dimensional effect.

According to an embodiment of the present invention having the configuration as described above, the metal pattern layer covering the light-transmissive pattern is formed on the touch sensor and exposed outwardly. Thus, a feeling as if a metal is deposited on a rear surface of the window can be implemented through the same fabrication process as that of the related art, without having to additionally perform a process for depositing a metal on a rear surface of the window or attach a decoration thereto, whereby the mobile terminal capable of implementing a picto part providing a high-end feeling, while saving production cost, can be provided.

In addition, since the metal pattern layer is etched to allow light to be transmitted therethrough, a metal image of the picto part can be provided eve in darkness, and since the various types of films and sheets are laminated to scattered-reflect light, an image of the picto part is prevented from having a shade and a spread of light is reduced, whereby the mobile terminal implementing the picto part providing a sophisticated feeling can be provided.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

A mobile terminal according to embodiments of the present invention will now be described with reference to the accompanying drawings, in which like numbers refer to like elements throughout although the embodiments are different, and a description of the like elements a first embodiment will be used for those of the different embodiment. As used herein, the singular forms "a", "an" and "the" are intended to include the plural forms as well, unless the context clearly indicates otherwise.

In the following description, usage of suffixes such as 'module', 'part' or 'unit' used for referring to elements is given merely to facilitate explanation of the present invention, without having any significant meaning by itself.

Mobile terminals described in the present disclosure may include cellular phones, smart phones, notebook computers, terminals for digital broadcasting, PDAs (Personal Digital Assistants), PMPs (Portable Multimedia Player), navigation devices, and the like. However, it would be understood by a person skilled in the art that the configuration according to embodiments of the present invention may also be applicable to the fixed types of terminals such as digital TVs, desk top computers, and the like, except for any elements especially configured for a mobile purpose.

Figure 1:
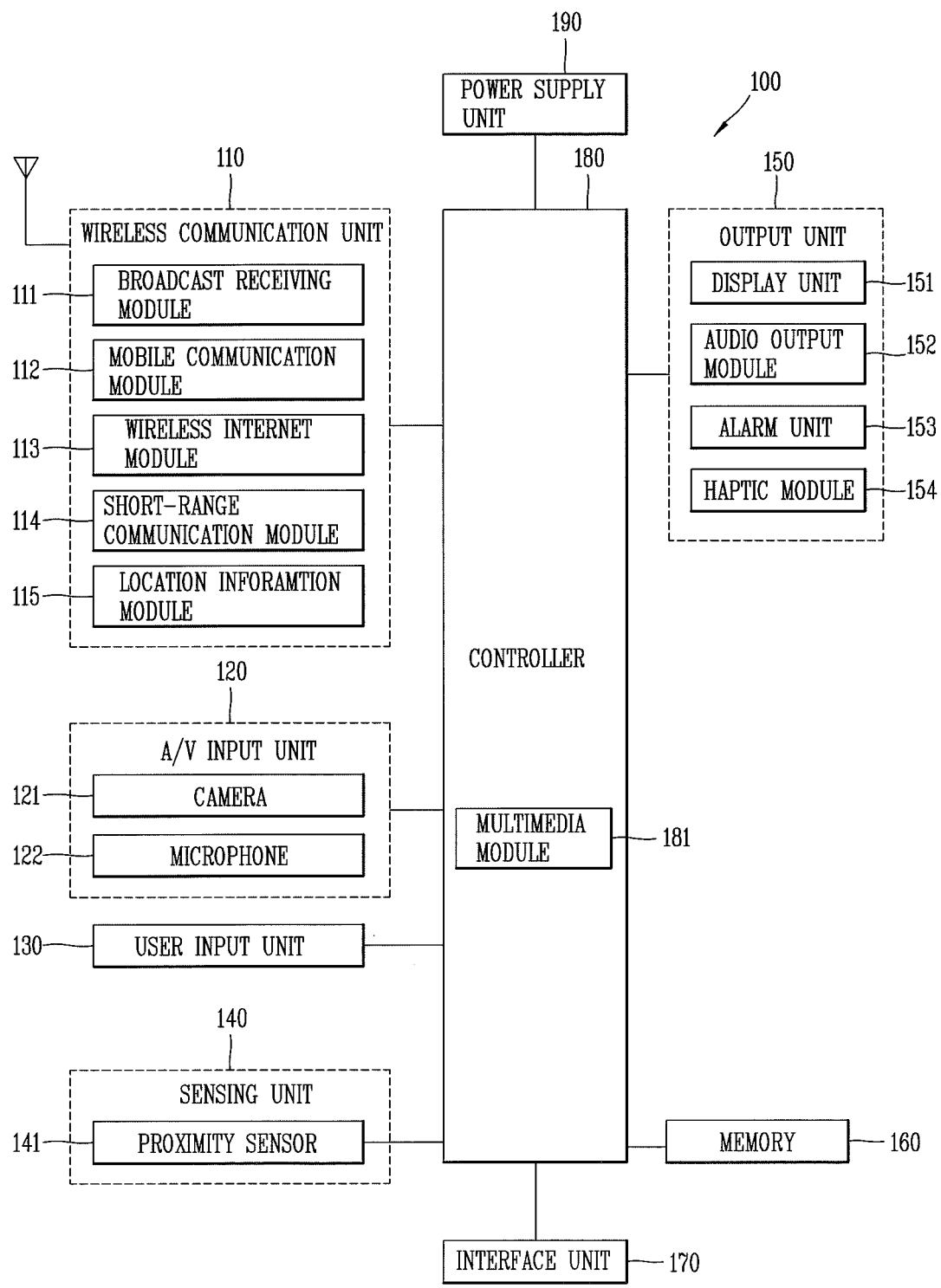
FIG. 1 is a block diagram of a mobile terminal in relation to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a control unit 180, and a power supply unit 190, etc. FIG. 1 shows the mobile terminal as having various components, but it should be understood that implementing all of the illustrated components is not a requirement. Greater or fewer components may alternatively be implemented. Hereinafter, the elements of the mobile terminal will be described in detail.

The wireless communication unit 110 typically includes one or more modules allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast related information may mean information related to a broadcast channel, broadcast program or broadcast provider. The broadcast related information may also be provided through a mobile communication network. In this case, the broadcast related information may be received by the mobile communication module 112.

The broadcast related information may exist in various forms. For example, the broadcast related information may exist in the form of an electronic program guide (EPG) of digital multimedia broadcasting (DMB), an electronic service guide (ESG) of digital video broadcast-handheld (DVB-H), etc.

The broadcast receiving module 111 may receive a digital broadcast signal using, for example, a digital broadcasting system including digital multimedia broadcasting-terrestrial (DMB-T), digital multimedia broadcasting-satellite (DMB-S), media forward link only (MediaFLO), digital video broadcasting-handheld (DMB-H), integrated service digital broadcast-terrestrial (ISDB-T), etc. It will be apparent that the broadcast receiving module 111 may be configured to be suitable for not only the aforementioned digital broadcasting system but also other broadcasting systems.

The broadcast signal and/or the broadcast related information may be stored in the memory 160 through the broadcast receiving module 111.

The mobile communication module 112 communicates a wireless signal with at least one of a base station, an external terminal and a server on a mobile communication network. The wireless signal may include various types of data according to the communication of a voice call signal, a video communication call signal or character/multimedia message.

The wireless Internet module 113 refers to a module for wireless Internet connection, and may be mounted inside or outside the mobile terminal 100. The wireless Internet technology may include wireless LAN (WLAN), wireless broadband (Wibro), world interoperability for microwave access (Wimax), high speed downlink packet access (HSDPA), etc.

The short range communication module 114 refers to a module for short range communication. The short range communication technology may include Bluetooth, radio frequency identification (RFID), infrared data association (IrDA), ultra wideband (UWB), Zigbee, etc.

The location information module 115 refers to a module for obtaining the position of a mobile terminal, and a global positioning system (GPS) module is used as a representative example of the location information module 115.

Referring to FIG. 1, the A/V input unit 120 is used to input an audio or video signal, and may include a camera 121, a microphone 122, etc. The camera 121 processes an image frame such as a still image or moving image obtained by an image sensor in a video communication mode or photographing mode. The processed image frame may be displayed on the display unit 151.

The image frame processed in the camera 121 may be stored in the memory 16 or may be transmitted to the outside of the mobile terminal 100 through the wireless communication unit 110. The camera 121 may be provided with two or more cameras according to the environment used.

The microphone 122 receives an external audio signal by a microphone in a communication mode, recording mode, voice recognition mode, etc. and processes the received audio signal as electrical voice data. In case of the communication mode, the processed voice data may be converted into a form capable of being transmitted to a mobile communication base station through the mobile communication module 112 and then transmitted. Various noise removal algorithms for removing noises generated in the process of receiving the input external audio signal may be implemented in the microphone 122.

The user input unit 130 generates input data through which the user controls operations of the mobile terminal. The user input unit 130 may be configured to include a key pad, a dome switch, a touch pad (static voltage/static current), a jog wheel, a jog switch, etc.

The sensing unit 140 senses a current state of the mobile terminal 100, such as an opening/closing state, a position of the mobile terminal 100, a presence of user's contact with the mobile terminal 100 or an increase/decrease in the speed of the mobile terminal 100, and generates a sensing signal for controlling an operation of the mobile terminal 100. For example, when the mobile terminal 100 has the form of a slide phone, the sensing unit 140 may sense the presence of opening/closing of the slide phone. The sensing unit 140 may sense whether or not the power supply unit 190 supplies power, whether or not the interface unit 170 is connected to an external device, etc.

The output unit 150 is used to generate an output related to a visual sense, auditory sense, haptic sense, etc. The output unit 150 may include a display unit 151, a sound output module, an alarm unit 153, a haptic module 154, etc.

The display unit 151 displays (outputs) information processed in the mobile terminal 100. For example, when the mobile terminal 100 is in a communication mode, the display unit 151 displays a user interface (UI) or graphic user interface (GUI) related to communication. When the mobile terminal 100 is in a video communication mode or photographing mode, the display unit 151 displays a photographed and/or received image, UI or GUI.

The display unit 151 may include at least one of a liquid crystal display (LCD), a thin film transistor-liquid crystal display (TFT LCD), an organic light-emitting diode (OLED), a flexible display, a 3D display and an electronic-ink (e-ink) display.

Some of the displays may be configured as transparent or light-transmissive displays through which a user can see an outside view. These displays may be called as transparent displays, and a transparent OLED (TOLED), etc. may be used as a representative of the transparent displays. The rear structure of the display unit 151 may also be configured as a light-transmissive structure. Through such a structure, the user can see an object positioned at the rear of a body of the mobile terminal 100 through an area occupied by the display unit 151 of the body of the mobile terminal 100.

Two or more display units 151 may exist according to the implementation of the mobile terminal 100. For example, in the mobile terminal according to the exemplary embodiments, a plurality of display units may be spaced apart from one another or integrally arranged on one surface, or may be arranged on different surfaces from one another.

When the display unit 151 and a sensor sensing a touch operation (hereinafter, referred to as a 'touch sensor') forms an inter-layer structure (hereinafter, referred to as a 'touch screen'), the display unit 151 may be used as an input device as well as an output device. The touch sensor may have the form of, for example, a touch film, touch sheet, touch pad, etc.

The touch sensor may be configured to convert, into an electrical input signal, a change in pressure applied to a specific portion of the display unit 151, capacitance generated at the specific portion of the display unit 151, etc. The touch sensor may have, for example, the form of a touch film, a touch sheet, a touch pad, etc.

When the touch sensor senses a touch input, a signal(s) corresponding to the touch input is transmitted to a touch control unit. The touch control unit processes the signal(s) and transmits data corresponding to the processed signal(s) to the control unit 180. Accordingly, the control unit 180 can detect which portion of the display unit 151 has been touched, etc.

Referring to FIG. 1, a proximity sensor may be disposed in an internal region of the mobile terminal or in the vicinity of the touch screen. The proximity sensor refers to a sensor that detects, without any mechanical contact, the presence of an object approaching a predetermined detection surface or an object existing near the predetermined surface using an electromagnetic force or infrared. The proximity sensor has a longer lifetime and higher utilization than a contact sensor.

The proximity sensor may include, for example, a transmissive photoelectric sensor, a mirror reflective photoelectric sensor, a high-frequency oscillation proximity sensor, a capacitive proximity sensor, a magnetic proximity sensor, an infrared proximity sensor, etc. When the touch screen is a capacitive touch screen, the touch screen is configured to detect the proximity of a pointer through a change in electric field according the proximity of the pointer. In this case, the touch screen (touch sensor) may be classified as the proximity sensor.

Hereinafter, for convenience of illustration, the action that the pointer comes close to the touch screen while not being contacted on the touch screen so as to be recognized that the pointer is placed on the touch screen is referred to as a "proximity touch," and the action that the pointer is substantially contacted on the touch screen is referred to as a "contact touch." The position at which the pointer is proximately touched on the touch screen means a position at which when the pointer is proximately touched, the pointer corresponds vertically to the touch screen.

The proximity sensor senses a proximity touch action and a proximity touch pattern (e.g., a proximity touch distance, proximity touch direction, proximity touch speed, a proximity touch time, proximity touch position, proximity touch movement state, etc.). Information corresponding to the sensed proximity touch action and proximity touch pattern may be output on the touch screen.

The sound output module 152 may receive a call signal from the wireless communication unit 110 in a communication or recoding mode, voice recognition mode, broadcast receiving mode, etc., and may output the audio data stored in the memory 160. The sound output module 152 may output a audio signal related to a function (e.g., a call signal receiving sound, message receiving sound, etc.) performed by the mobile terminal 100. The sound output module 152 may include a receiver, a speaker, a buzzer, etc.

The alarm unit 153 outputs a signal for informing that an event occurs in the mobile terminal 100. The event occurring in the mobile terminal 100 includes, for example, call signal reception, message reception, key signal input, touch input, etc. The alarm unit 153 may output, for example, a signal for informing the occurrence of an event through vibration, as well as a video or audio signal. Since the video or audio signal may be output through the display unit 151 or the sound output module 152, the display unit 151 and the sound output module 152 may be classified as a portion of the alarm unit 153.

The haptic module 154 generates various haptic effects that a user can feel. A vibration is used as a representative of the haptic effects generated by the haptic module 154. The intensity and pattern of the vibration generated by the haptic module 154 may be controlled. For example, different vibrations may be synthesized and output or may be sequentially output.

In addition to the vibration, the haptic module 154 may generate various haptic effects including an effect caused by the arrangement of pins performing a vertical movement on a contact skin surface, an effect caused by the jet force or absorption force of air through an absorption port, an effect caused by the graze through a skin surface, an effect caused by the contact of an electrode, an effect caused by a stimulus such as an electrostatic force, an effect caused by the reproduction of a cool and warm feeling using an element for heat absorption or generation, etc.

The haptic module 154 may be implemented not only to provide a user with a haptic effect through a direct contact but also to allow the user to feel a haptic effect through a muscle sense using a finger, arm, etc. The haptic module 154 may be provided with two or more haptic modules according to the environment used.

The memory 160 may store a program for operations of the control unit 180, and may temporarily store input/output data (e.g., a phone book, a message, a still image, a moving image, etc.). The memory 160 may store data for vibration and sound of various patterns, which are output when a touch is input on the touch screen.

The memory 160 may include a storage medium of at least one of a flash memory type, a hard disk type, a multimedia card micro type, a card type memory (e.g., an SD or XD memory, etc.), a random access memory (RAM), a static random access memory (SRAM), a read-only memory (ROM), an electrically erasable programmable read-only memory (EEPROM) and a programmable read-only memory (PROM). The mobile terminal 100 may operate a web storage performing a storage function of the memory unit 160 on the Internet or may operate in relation to the web storage.

The interface unit 170 serves as a gateway to all external devices connected to the mobile terminal 100. The interface unit 170 may receive data from an external device, may receive power and provide the received power to each of the components in the mobile terminal 100, or may allow data in the mobile terminal 100 to be transmitted to the external device. For example, the interface unit 170 may include a wired/wireless headset port, an external charger port, a wired/wireless data port, a memory card port, a port for connecting an apparatus provided with an identification module, an audio input/output (I/O) port, a video I/O port, an earphone port, etc.

The identification module is a chip in which various information for authenticating the use right of the mobile terminal 100, and may include a user identify module (UIM), a subscriber identity module (SIM), a universal subscriber identity module USIM, etc. The apparatus provided with the identification module (hereinafter, referred to as an 'identification apparatus') may be manufactured in the form of a smart card. Therefore, the identification apparatus may be connected to the mobile terminal 100 through a port.

When the mobile terminal 100 is connected to an external cradle, the interface unit 170 may become a path along which power is supplied from the cradle to the mobile terminal 100, or may become a path along which various command signals input from the cradle are provided to the mobile terminal 100. The power or various command signals input from the cradle may be operated as a signal for recognizing that the mobile terminal 100 has been exactly mounted to the cradle.

The control unit 180 generally controls overall operations of the mobile terminal 100. For example, the control unit 180 performs relative control and processing for voice conversation, data communication, video conversation, etc. The control unit 180 may have a multimedia module 182 for multimedia reproduction. The multimedia module 182 may be implemented in the control unit 180 or may be implemented separately from the control unit 180.

The control unit 180 may perform pattern recognition processing so that writing or drawing input performed on the touch screen can be recognized as a character or image.

The power supply unit 190 receives external power and/or internal power under a control of the control unit 180 so as to supply power necessary for the operation of each of the components.

The various exemplary embodiments described herein may be implemented in a recording medium readable by a computer or device similar to the computer, for example, using software, hardware or combination of the software and hardware.

According to the implementation using the hardware, the exemplary embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, control units, micro-control units, microprocessors and electrical units for performing other functions. In some cases, the exemplary embodiments described in this specification may be implemented as the control unit 180 itself.

According to the implementation using the software, exemplary embodiments such as procedures and functions described in this specification may be implemented as separate software modules. Each of the software modules may perform one or more functions and operations described in this specification. Software codes may be implemented using a software application written by an appropriate programming language. The software codes may be stored in the memory 160, and may be performed by the control unit 180.

Figure 2A:
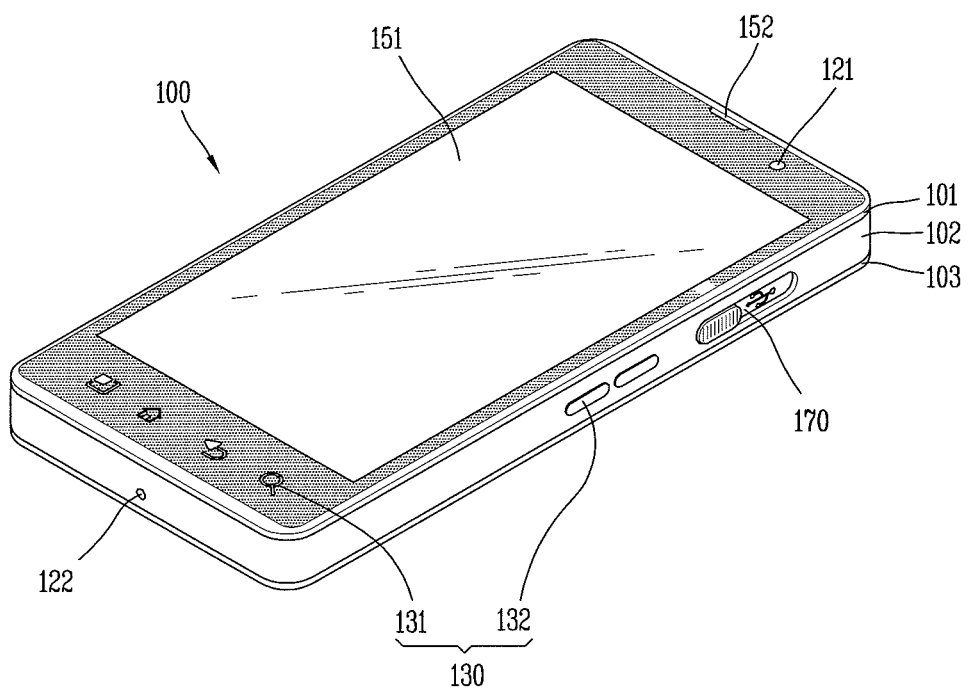
FIG. 2A is a front perspective view of the mobile terminal in relation to an embodiment of the present invention.
Figure 2B:
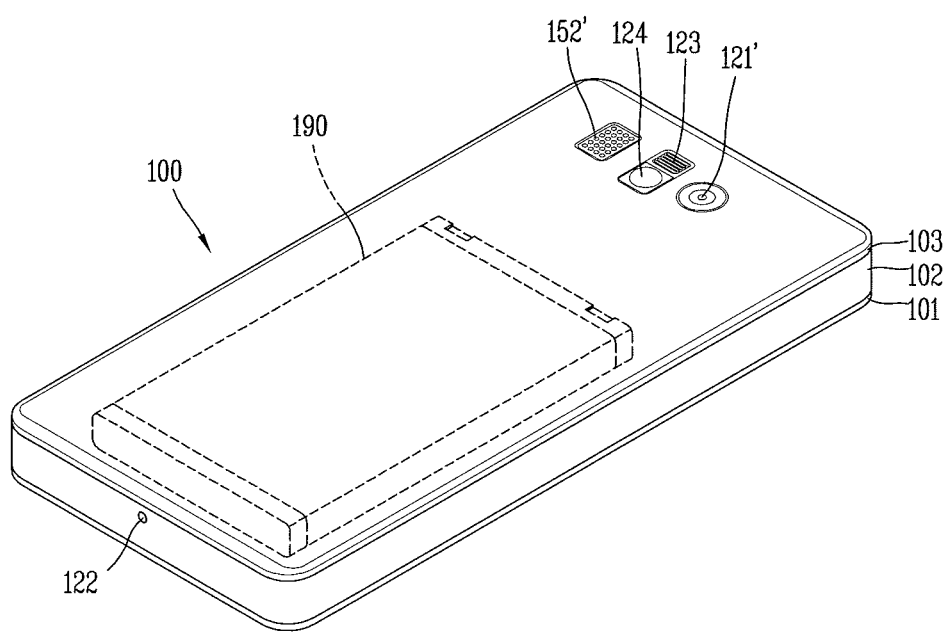
FIG. 2B is a rear perspective view of the mobile terminal illustrated in FIG. 2A.

FIG. 2A is a front perspective view of the mobile terminal in relation to an embodiment of the present invention. FIG. 2B is a rear perspective view of the mobile terminal illustrated in FIG. 2A.

Referring to FIGS. 1, 2A, and 2B, the mobile terminal 100 has a bar type terminal body. However, without being limited thereto, the present invention may also be applicable to a slide type mobile terminal, a folder type mobile terminal, a swing type mobile terminal, and the like, in which two or more bodies are coupled to be movable relatively. In addition, the mobile terminal 100 described in the present disclosure may also be applicable to a certain portable electronic device having a camera and a flash, e.g., a cellular phone, a smart phone, a notebook computer, a digital broadcasting terminal, a personal digital assistant (PDA), a portable multimedia player (PMP), or the like.

The terminal body includes a case (or casing, housing, cover, etc.) constituting an external appearance of the terminal body. In the present embodiment, the case may be divided into a front case 101, a battery cover 103 covering a surface opposite the front case 101, and a rear case 102. Various electronic components are installed in the space between the front case 101 and the rear case 102. The cases may be formed by injection-molding a synthetic resin or may be made of a metallic material such as stainless steel (STS) or titanium (Ti), etc.

A display unit 151, a first audio output unit 152, a signal input unit 130, and a front camera unit 121 are disposed on the front surface of the terminal body.

The display unit 151 may be implemented as a liquid crystal display (LCD) module, an organic light emitting diode (OLED) module, an e-paper, and the like, that visually displays information. The display unit 151 may include a touch sensing unit allowing for an inputting operation in a tactile manner Hereinafter, the display unit 151 including a touch sensing unit will be referred to as a 'touch screen'. When a point on the display unit 151 is touched, content corresponding to the touched position is inputted. The content inputted in the tactile manner may be characters, numbers, menu items that can be indicated or designated in various modes, and the like. The touch sensing unit may be light-transmissive to allow the display unit 151 to be visible, and may have a structure for enhancing visibility of the touch screen in a bright area. In FIG. 2A, the touch screen occupies a majority of the front surface of the front case 101.

The first audio output unit 152 may be implemented in the form of a receiver that transfers a speaker sound to the user's ear, or in the form of a loud speaker for outputting various alarm sounds or a multimedia reproduction sound of multimedia.

The front camera unit 121 processes image data of still pictures or video obtained by an image sensor in a video capturing mode or an image capturing mode. The processed image frames may be displayed on a display unit 151.

The image frames processed by the front camera 121 may be stored in the memory 160 or transmitted via the wireless communication unit 110. Two or more front camera units 121 may be provided according to a usage environment.

The signal input unit 130 is manipulated to receive a command for controlling the operation of the mobile terminal 100 and may include a plurality of input units. The input units may be generally referred to as a manipulating portion, and any methods and techniques may be employed for the manipulating portion so long as they can be operated by the user in a tactile manner.

For example, the manipulating portion may be implemented as a dome switch, a touch screen, or touch pad which can receive information or commands input by the user in a pushing or touching manner, or implemented in a manner of using a wheel, a jog or a joystick to rotate keys. Content input by the signal input unit 130 may be variably configured. For example, the manipulating portion may serve to input a command such as starting, ending, scrolling, etc.

A side key 132, an interface unit 170, an audio input unit 122, and the like, are disposed on the side of the rear case 102.

The side key 132 may be generally called a manipulation unit, and configured to receive a command for controlling the operation of the mobile terminal 100. The side key 132 may employ any scheme so long as it can be manipulated in a tactile manner by the user. Content inputted by the side key 132 may be variably set. For example, a command for controlling the image input unit, a command for adjusting of the size of a sound output from the audio output unit 152, or a command for changing the display unit 151 into a touch recognition mode, and the like, may be received.

The audio input unit 122 may be implemented in the form of a microphone in order to receive the user voice, other sounds, and the like.

The interface unit 170 may be used as a communication link (or passage, path, etc.) through which the mobile terminal can exchange data or the like with an external device. For example, the interface unit 170 may be implemented in the form of a connection port for connecting an earphone to the mobile terminal via a wired or wireless means, a port for short-range communications (e.g., an Infrared Data Association (IrDA) port, a Bluetooth™ port, a wireless LAN port, etc.), power supply ports for providing power to the mobile terminal 100, or the like. Also, the interface unit 170 may be a card socket for accommodating a SIM (Subscriber Identification Module) card or a UIM (User Identity Module) card, or an external card such as a memory card for storing information.

The power supply unit 190 and a rear camera unit 121' are disposed on the rear surface of the terminal body.

A flash 123 is disposed to be adjacent to the rear camera unit 121'. The flash 123 illuminates a subject when an image of the subject is captured by using the rear camera unit 121'.

A mirror 124 may be disposed to be adjacent to the flash 123. The mirror allows the user to see himself when he wants to capture his own image (i.e., self-image capturing) by using the rear camera unit 121'.

For example, front camera unit 121 may operate with a relatively lower resolution to capture an image(s) of the user's face and immediately transmit such image(s) to another party in real-time during video call communication or the like. Meanwhile, the rear camera unit 121' may operate with a relatively higher resolution to capture images of general objects with high picture quality, which may not require immediately transmission in real time. The cameras 121 and 121' may be installed on the terminal such that they are rotated or popped up.

A battery supplies power to the mobile terminal 100. The battery may be installed in the terminal body or may be detachably attached to the terminal body.

As mentioned above in the description of the background of the invention, as the mobile terminal 100 is considered as a personal belonging to express personality, various designs are required. Designs of mobile terminal include structural alteration improving the exterior of mobile terminals and improvements.

As one of the structural alternations and improvements, recently, research has been conducted to improve an image of a picture portion (hereinafter, referred to as a 'picto part') of a front key button portion 131 in order to implement a terminal providing a high-end feeling. Hereinafter, a novel structure providing a high-end visual effect to an image of a picto part and implementing the same will be described in detail.

Figure 3:
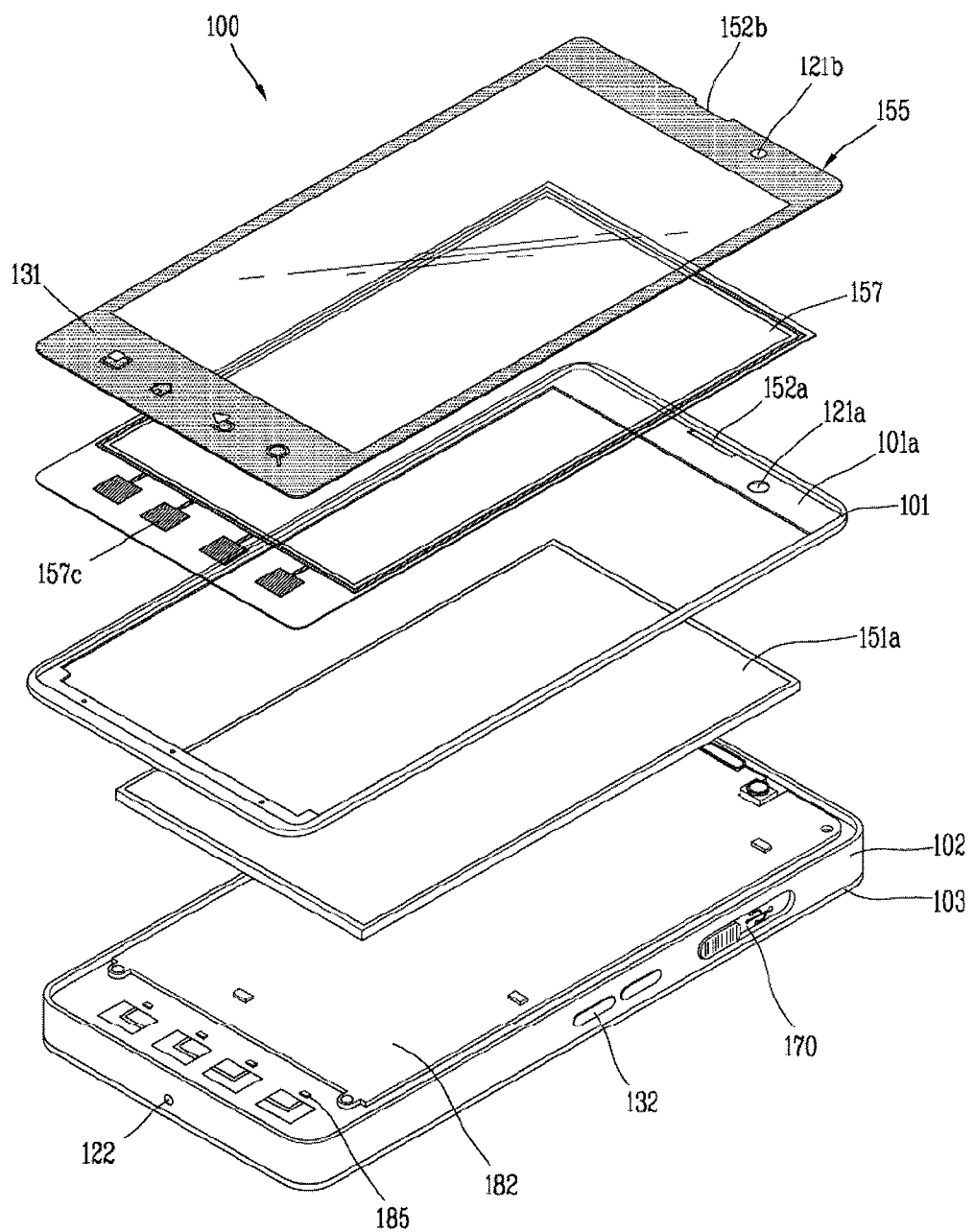
FIG. 3 is an exploded perspective view of the mobile terminal illustrated in FIG. 1.

FIG. 3 is an exploded perspective view of the mobile terminal 100 of FIG. 1.

Referring to FIG. 3, a circuit board 182 is disposed within a terminal body. The circuit board 182 is installed in the rear case 102 or may be installed an internal structure. The circuit board 182 may be configured as an example of a control unit for operating various functions of the mobile terminal 100. As illustrated, the first audio output unit 152 the first camera unit 121, and the like, may be installed on the circuit board 182.

A display unit is disposed on one surface of the terminal body in order to display information processed in the mobile terminal 100. The display unit may be disposed to occupy the majority of the front surface of the terminal body. The display unit may include the display unit 151 and the window 155 covering the display 151a.

The mobile terminal 100 includes a frame accommodating the display 151a. In the present embodiment, the frame is configured as the front case 101 constituting the exterior of the terminal body. Unlike the frame illustrated in FIG. 3, the frame may be configured as an internal structure different from the front case 101. The front case 101 may include an installation portion 101a. The installation portion 101a is recessed from one surface of the front case 101 to form a space allowing the window 155 to be installed therein. The installation portion 101a includes a hole 121a corresponding to the camera unit 121 and a sound hole 152a corresponding to the audio output unit 152. The sound hole 152a may be disposed to be adjacent to a side wall of the front case 101.

The window 155 is installed in the installation portion 101a. A portion of the window 155 through which light is transmitted may have an area corresponding to the display 151a. Accordingly, the user may recognize visual information output from the display 151a from the outside.

The window 155 may be made of a material allowing light to be transmitted therethrough. For example, the window 155 may be made of a light-transmissive synthetic resin, tempered glass, or the like. The window 155 is divided into a central region corresponding to the display 151a and an edge region surrounding the central region. The edge region may be supportably installed in the installation portion 101a, and a colored ink layer 156 may be formed in the edge region in order to differentiate the edge region from the central region.

A key button portion 131 may be formed in the edge region. The key button portion 131 may include a region (i.e., a picto part) with a picture drawn therein. The picto part may form an image by a light-transmissive pattern 156a formed in the colored ink layer 156. Since an ink layer is not formed in the region of the light-transmissive pattern 156a, light is transmitted therethrough, like the central region of the window 155. Namely, the user can view the interior of the picto part.

Also, a recess may be formed on the side of the window 155 and disposed to face a side wall of the front case 101 to form an assembly gap 152b. According to this structure, a sound generated from the audio output unit 152 is emanated along the assembly gap 152b between the front case 101 and the window 155. Thus, a hole for outputting a sound is not required, and thus, the exterior of the mobile terminal 100 can become simpler.

The display 151a is disposed on a rear surface of the window 155 and is accommodated in the front case 101 to constitute the display unit together with the window 155. The display 151a is electrically connected to the circuit board 182 and is configured to output visual information under the control of the control unit. The display 151a may have an area corresponding to a portion of the window 155 through which light is transmitted.

As illustrated, a touch sensor 157 is disposed to cover a rear surface of the key button portion 131 of the window 155 to sense a touch input applied to the picto part. Also, the touch sensor 157 may be formed to cover even the central region of the display 151a as well as the edge region thereof in which the key button portion 131 is formed, to sense a touch input with respect to visual information output through the display 151a.

The touch sensor 157 may be configured to convert a change in a voltage, a quantity of electric charge, and the like, generated in a particular portion of the window 155 into an electrical input signal. The touch sensor 157 is formed to be transparent allowing visual information formed on the display 151a to be visible therethrough.

The touch sensor 157 may be made of a conductive material. The touch sensor 157 may be formed by printing a conductive pattern on the window 155, or may be formed by depositing a conductive pattern formed as a film on the window 155. The conductive material may include indium tin oxide (ITO), carbon nano-tube (CNT), a conductive polymer, In2O3, SnO2, Au, or the like.

The touch sensor 157 may be configured as a film and attached to a rear surface of the window 155. Here, an adhesive layer may be disposed between the window 155 and the touch sensor 157 in order to bond them. As the adhesive layer, optical clear adhesive (OCA), a super view resin (SVR), or the like, may be used.

Figure 4:
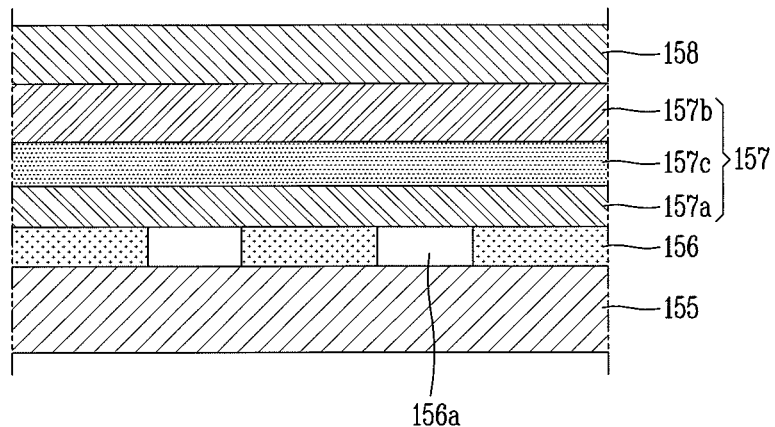
FIG. 4 is a cross-sectional view illustrating an example of a touch sensor in relation to an embodiment of the present invention.

FIG. 4 is a cross-sectional view of the touch sensor according to an embodiment of the present invention.

Referring to FIG. 4, the touch sensor 157 may include first and second electrode films 157a and 157b disposed as layers.

The first electrode film 157a is disposed on an upper surface of the installation portion 101a. The first electrode film 157a extends in a first direction, and is configured to sense a touch input applied in the first direction. The second electrode film 157b is disposed to cover the first electrode film 157a. The second electrode film 157b extends in a second direction and is configured to sense a touch input applied in the second direction.

For example, the first electrode film 157a may be formed to sense a touch input applied in a width direction of the mobile terminal 100 and the second electrode film 157b may be formed to sense a touch input applied in a length direction of the mobile terminal 100. The first and second electrode films 157a and 157b may be light-transmissive conductive films such as indium tin oxide (ITO) films, carbon nano-tube (CNT) films, or the like. An adhesive layer such as an OCA, SVR, or the like, may be disposed between the first electrode film 157a and the second electrode film 157b in order to bond them.

The touch sensor 157 may measure a change in a quantity of electric charge in the first and second directions through the first and second electrode films 157a and 157b. The touch sensor 157 may be electrically connected to the printed circuit board (PCB) 182 including a detection unit. The detection unit is connected to the first and second electrode films 157a and 157b, respectively, to detect a touch input applied to an input region by using a detected change in a quantity of electric charge.

For example, when a conductor such as a user's finger, a touch pen, or the like, touches the window 155, electrons present in the window 155 move to the conductor, and the touch sensor 157 senses a change in a quantity of the electric charge to measure coordinates.

The touch sensor 157 may include a conductive pattern transmitting signals from the first and second electrode films 157a and 157b to the detection unit. The conductive pattern may be formed in a touch sensor region corresponding to an edge region of the window. The detection unit is connected to the control unit. Upon receiving a signal from the detection unit, the control unit controls an operation of the terminal.

The conductive pattern may be disposed between the first and second electrode films 157a and 157b. A metal pattern 157c may be formed on the same plane on which the conductive pattern is formed. The metal pattern 157c may be attached to a rear surface of the first electrode film 157a. Here, an adhesive layer such as OCA, SVR, or the like, is disposed between the metal pattern 157c and the first electrode film 157a in order to bond them. The metal pattern 157c may be electrically connected to the conductive pattern, and the conductive pattern may extend overlap with the edge region of the display to play the role of the metal pattern 157c.

During a process of fabricating the touch sensor 157, the metal pattern 157c may be deposited together with the conductive pattern on the rear surface of the first electrode film 157a to fabricate the touch sensor 157 through the same process as that of a related art, without increasing material cost.

The first and second electrode films 157a and 157b are transparent, so the metal pattern 157c disposed between the first and second electrode films 157a and 157b is visible from the outside. The touch sensor 157 is disposed to cover the window 155, and the metal pattern 157c is formed to cover the rear surface of the key button portion 131. The metal pattern 157c covering the key button portion 131 is exposed through the light-transmissive pattern 156a of the key button portion 131. The non-light-transmissive colored ink layer 156 is formed in a region excluding the picto part of the key button portion 131, providing a feeling that metal is deposited only in the picto part.

The picto part may be configured to be illuminated. To this end, a light source 185 (FIG. 6) may be disposed on a rear surface of the key button portion 131. The light source 185 may be electrically connected to the circuit board 182. For example, a light emitting diode (LED) having a high level of luminance may be used as the light source 185. Also, a light guide film 158 may be disposed on a rear surface of the touch sensor 157 to guide light irradiated from the light source 185 to the key button portion 131. The light guide film 158 may be formed to correspond to the key button portion 131 in order to illuminate the entirety of the key button portion 131.

Figure 5:
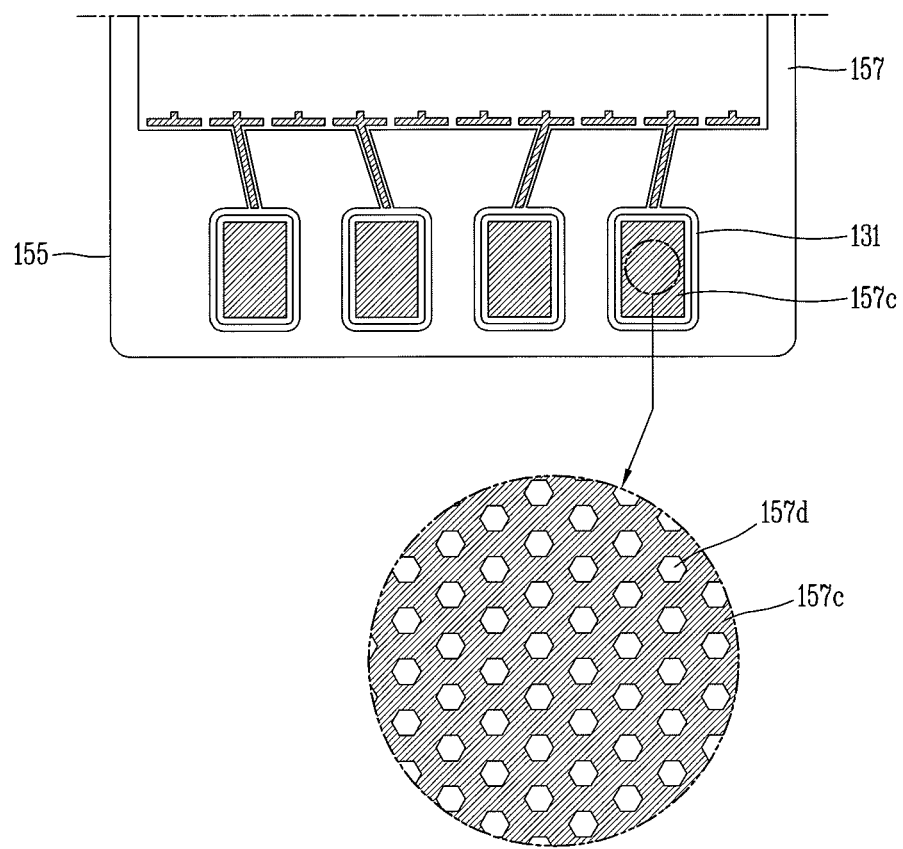
FIG. 5 is an enlarged conceptual view of a metal pattern in FIG. 3.

FIG. 5 is an enlarged conceptual view of the metal pattern of FIG. 3.

A light-transmissive portion 157d may be formed in the metal pattern 157c in order to allow light from the light source 185 to be emitted to the picto part. The light-transmissive portion 157d may be processed to have a net-like shape. The light-transmissive portion 157d may be configured as a plurality of holes forming a particular pattern. The holes may have any shape, and as illustrated in FIG. 5, in a case in which holes having a regular hexagonal shape may be spaced apart from one another to form a predetermined pattern, a lighting effect can be maximized.

An aperture ratio of the light-transmissive portion 157d may be determined within a range from 25% to 40%. The aperture ratio of the light-transmissive portion 157d refers to a ratio of the holes to the entire area. When the aperture ratio is less than 25%, light-transmission of the light source 185 through the picto part is lowered to have difficulty in implementing a picto part providing a metal feeling. Meanwhile, when the aperture ratio is more than 40%, the area of the metal pattern 157c exposed through the picto part is reduced, having difficulty in implementing a picto part providing a metal feeling.

A recess or a protrusion may be formed on a surface of the metal pattern 157c and metal having a different color may be deposited thereon to change a feeling provided by the picto part. A surface of the metal pattern 157c may be etched, a color layer may be deposited on a surface of the metal pattern 157c, or a surface of the metal pattern 157c may be subjected to 3D patterning (NCVM, UV molding, multi-deposition, digital printing, molding, or the like). A perspective may be expressed according to an etched shape, and a rainbow effect, or the like, may be implemented through surface machining.

Figure 6:
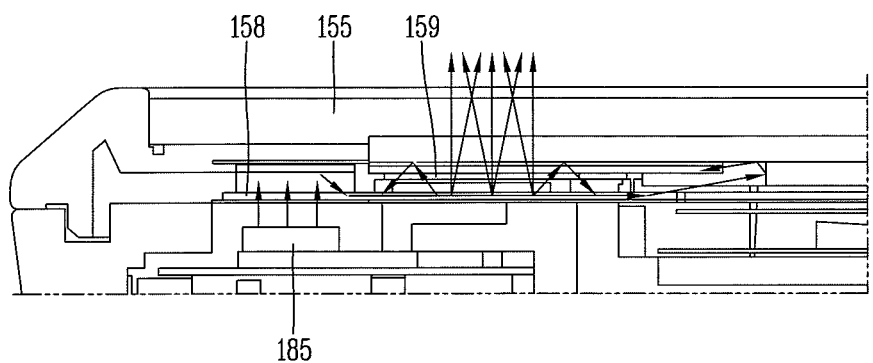
FIG. 6 is a conceptual view of a mobile terminal employing a diffusion sheet.
Figure 6:
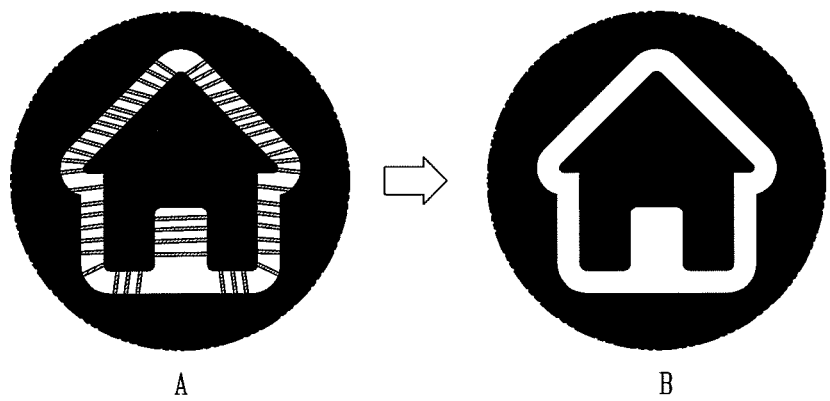

FIG. 6 is a conceptual view of the mobile terminal 100 employing a diffusion sheet 159.

Referring to FIG. 6, the light source 185 is disposed on a rear surface of the key button portion 131, and the light guide film (LGF) 158 is disposed on a rear surface of the touch sensor 157 to guide light irradiated from the light source 185 to the key button portion 131. The light-transmissive portion 157d may be formed in the metal pattern 157c covering the key button portion 131, and the light-transmissive portion 157d may have holes. A region including the holes and a blocked region each have a different light transmittance, so a light-transmissive pattern may have a shade as illustrated in A of FIG. 6.

As illustrated, the diffusion sheet 159 may be attached to an upper surface of the light guide film 158. Light passing through the light guide film 158 is scattered-reflected by the diffusion sheet 159 and diffused in several directions to as to be emitted as a light-transmissive pattern of the key button portion. Light diffused in several directions passes through the light-transmissive portion 157d of the metal pattern 157c so as to be reflected and refracted in several directions. Thus, a shade generated in the light-transmissive pattern is reduced as illustrated in B of FIG. 6.

According to another embodiment of the present invention, a plurality of protrusion patterns may be formed to be protruded from the surface of the light guide film such that they are perpendicular to the surface of the light guide film 158. The protrusion patterns may have a protuberated embossed shape, or a separate member may be integrally deposited on a surface of the light guide film 158. The protrusion patterns may diffuse or focus light, so it may play the same role as that of the diffusion sheet 159. Recesses may be irregularly formed on a surface of the light guide film 158 to play the same role.

Figure 7:
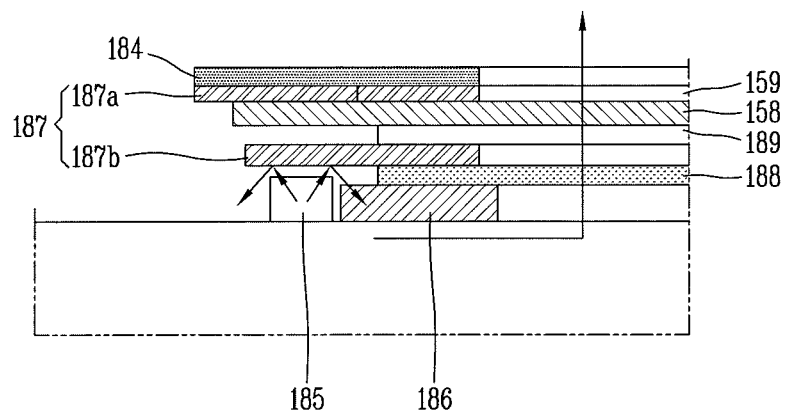
FIG. 7 is a conceptual view illustrating a path along which light moves from a light source according to an embodiment of the present invention.

FIG. 7 is a conceptual view illustrating a path along which light moves from the light source 185.

As illustrated in FIG. 7, a reflective sheet 187 may be disposed between the light source 185 and the window 155. The reflective sheet 187 includes a lower reflective sheet 187b disposed above the light source 185 in order to prevent light irradiated from the light source 185 from deviating from a determined path and being diffused, and an upper reflective sheet 187a attached to an upper surface of the light guide film 158 in order to prevent light passing through the light guide film 158 from deviating from the determined path and being diffused.

The light source 185 may be attached to an upper surface of the circuit board 182. In order to secure an installation height of the light source 185, a reinforcing plate 186 may be formed on the circuit board 182. A white sheet 188 is attached to an upper surface of the reinforcing plate 186, and the lower reflective sheet 187b is attached to an upper surface of the white sheet 188. The lower reflective sheet 187b and the light guide film 158 are attached by a double-sided tape 189. The double-sided tape 189 has light transmittance. The upper reflective sheet 187a and the diffusion sheet 159 are attached to an upper surface of the light guide film 158. A light blocking tape 184 is attached to an upper surface of the upper reflective sheet 187a to prevent light from being released out. The key button portion 131 is disposed on an upper portion of the diffusion sheet 159. The light-transmissive pattern 156a is formed on a rear surface of the key button portion 131, and light passing through the path illustrated in FIG. 7 is emanated outwardly through the light-transmissive pattern 156a. Since light, passing through the diffusion sheet 159, is diffused in all directions, a generation of a shade in the light-transmission pattern 156a can be reduced.

Figure 8:
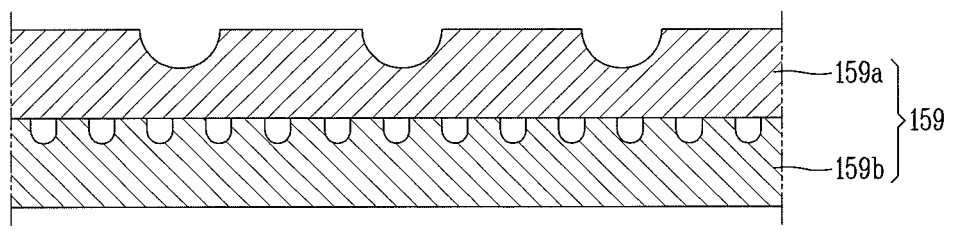
FIG. 8 is a cross-sectional view illustrating another example of the diffusion sheet in relation to an embodiment of the present invention.

FIG. 8 is a cross-sectional view of the diffusion sheet 159 according to an embodiment of the present invention.

The diffusion sheet 159 may be fabricated by attaching bead particles made of a synthetic resin and scattering light to a transparent synthetic resin sheet such as polyethylene, polycarbonate, polymethylmethacrylate (PMMA), or the like. Also, according to an embodiment of the present invention, the diffusion sheet 159 may include a first layer 159a and a second layer 159b laminated to have different refractive indices. The first layer 159a or the second layer 159b has a plurality of recesses having an irregular pattern formed thereon to disperse incident light in various directions. Also, a plurality of protrusions may be formed on the surface of the first layer 159a or the second layer 159b to disperse light in various directions.

The first layer 159a and the second layer 159b may have recesses or protrusions having different shapes. Light made incident to the second layer 159b from the light guide film 158 may be refracted or dispersed by the recesses or protrusions formed on the surface of the second layer 159b. The first layer 159a has a different refractive index from that of the second layer 159b. Thus, light made incident to the first layer 159a from the second layer 159b is refracted again. Light passing through the first layer 159a is dispersed again by the recesses or protrusions formed on the surface of the first layer 159a. Through the foregoing processes, light is dispersed in various directions and emitted outwardly from the light-transmissive pattern 156a.

According to an embodiment of the present invention having the configuration as described above, the light-transmissive pattern 156a is formed on the key button portion 131 of the window 155, and the metal pattern 157c layer covering the light-transmissive pattern 156a is formed on the touch sensor 157 and exposed outwardly. Thus, a feeling as if a metal is deposited on a rear surface of the window can be implemented through the same fabrication process as that of the related art, without having to additionally perform a process for depositing a metal on a rear surface of the window 155 or attach a decoration thereto, whereby the mobile terminal 100 capable of implementing a picto part providing a high-end feeling, while saving production cost, can be provided.

In addition, since the metal pattern 157c layer is etched to allow light to be transmitted therethrough, a metal image of the picto part can be provided even in darkness, and since the various types of films and sheets are laminated to scattered-reflect light, an image of the picto part is prevented from having a shade and a spread of light is reduced, whereby the mobile terminal 100 implementing the picto part providing a sophisticated feeling can be provided.

The mobile terminal 100 according to the embodiments of the present disclosure is not limited in its application of the configurations and methods, but the entirety or a portion of the embodiments can be selectively combined to be configured into various modifications.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a window including a key button portion;
   a light-transmissive pattern formed at a rear surface of the window;
   a touch sensor disposed to cover the rear surface of the window, the touch sensor comprising:
   a conductive pattern; and
   a metal pattern formed on the same plane as the conductive pattern, the metal pattern covering a rear surface of the key button portion so as to be exposed through the light-transmissive pattern;
   a light source located below a rear surface of the touch sensor;
   a light guide film disposed between the light source and the touch sensor to guide light irradiated from the light source toward the light-transmissive pattern; and
   a reflective sheet disposed between the light source and the window, the reflective sheet including:
   a lower reflective sheet disposed above the light source to prevent light irradiated from the light source from deviating from a determined path and being diffused; and
   an upper reflective sheet attached to an upper surface of the light guide film to prevent light passing through the light guide film from deviating from the determined path and being diffused, wherein the touch sensor further includes:
a first electrode film configured to detect the touch input when applied in a first direction;
a second electrode film configured to cover a rear surface of the first electrode film and to detect the touch input when applied in a second direction, and
the metal pattern disposed between the first and second electrode films, and
wherein the conductive pattern and the metal pattern are located on the rear surface of the first electrode film.

2. The mobile terminal of claim 1, further comprising a detection unit configured to detect a touch input applied to an input region of the touch sensor by detecting a change in a quantity of electric charges by the touch sensor.

3. The mobile terminal of claim 2, wherein the conductive pattern electrically connects the touch sensor and the detection unit.

4. The mobile terminal of claim 1, wherein the metal pattern includes a light-transmissive portion allowing light from the light source to pass therethrough.

5. The mobile terminal of claim 4, wherein the light-transmissive portion includes a plurality of holes arranged side by side to form a pattern, each of the holes having a particular shape.

6. The mobile terminal of claim 5, wherein the particular shape is a regular hexagonal shape.

7. The mobile terminal of claim 5, wherein an aperture ratio of the light-transmissive portion ranges from 25% to 40%.

8. The mobile terminal of claim 1, wherein the light guide film includes a plurality of protrusion patterns that protrude from a surface of the light guide film such that plurality of the protrusion patterns are perpendicular to the surface of the light guide film.

9. The mobile terminal of claim 1, wherein a diffusion sheet is disposed between the window and the light guide film in order to reflect the light irradiated from the light source irregularly.

10. The mobile terminal of claim 9, wherein the diffusion sheet comprises a synthetic resin and bead particles attached to the synthetic resin to scatter the light irradiated from the light source.

11. The mobile terminal of claim 10, wherein the synthetic resin sheet is made from one of polyethylene, polycarbonate, and polymethylmethacrylate (PMMA).

12. The mobile terminal of claim 9, wherein the diffusion sheet includes:
a first layer; and
a second layer located below the first layer, the first and second layers having different refractive indices.

13. The mobile terminal of claim 12, wherein a protrusion is formed on a surface of the first layer to refract light.

14. The mobile terminal of claim 13, wherein a recess is formed on a surface of the second layer to refract light.

15. The mobile terminal of claim 1, wherein the metal pattern is surface-machined to provide a tactile sensation at a side spaced from the touch sensor.

16. The mobile terminal of claim 15, wherein the surface-machining is performed by depositing a different metal on a surface of the metal pattern.

17. The mobile terminal of claim 15, wherein the surface-machining is performed by etching a surface of the metal pattern to provide a three-dimensional effect.

* * * * *